US009898235B2

(12) United States Patent
Bhaskaran et al.

(10) Patent No.: US 9,898,235 B2
(45) Date of Patent: Feb. 20, 2018

(54) MARKING AGENT CREDIT ADJUSTMENTS

(71) Applicant: HEWLETT-PACKARD DEVELOPMENT COMPANY, L.P., Houston, TX (US)

(72) Inventors: Shinoj Bhaskaran, Bangalore (IN); Ruby Tomar, Bangalore (IN); Puneet Kumar Arora, New Delhi (IN); Diane R. Hammerstad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/785,448

(22) PCT Filed: Jul. 24, 2013

(86) PCT No.: PCT/US2013/051855
§ 371 (c)(1),
(2) Date: Oct. 19, 2015

(87) PCT Pub. No.: WO2015/012824
PCT Pub. Date: Jan. 29, 2015

(65) Prior Publication Data
US 2016/0070514 A1    Mar. 10, 2016

(51) Int. Cl.
*G06F 3/12* (2006.01)
*H04N 1/00* (2006.01)
*G06K 15/02* (2006.01)

(52) U.S. Cl.
CPC .......... *G06F 3/1239* (2013.01); *G06F 3/1219* (2013.01); *G06F 3/1287* (2013.01); *G06K 15/1809* (2013.01)

(58) Field of Classification Search
None
See application file for complete search history.

(56) References Cited

U.S. PATENT DOCUMENTS

| 5,383,129 A | 1/1995 | Farrell |
| 5,495,411 A | 2/1996 | Ananda |

(Continued)

FOREIGN PATENT DOCUMENTS

| CN | 1617055 | 5/2005 |
| CN | 1699068 | 11/2005 |

(Continued)

OTHER PUBLICATIONS

International Search Report & Written Opinion received in PCT Application No. PCT/US2013/051855, dated Apr. 29, 2014, 15 pages.

(Continued)

*Primary Examiner* — Beniyam Menberu
(74) *Attorney, Agent, or Firm* — HP Inc. Patent Department

(57) ABSTRACT

In one example of the disclosure, account data that is indicative of marking agent credits attributed to a printer is stored. The printer is a printer connected to a supply of marking agent. A marking agent credit is to authorize consumption of a credit amount of marking agent from the supply according to a subscription. A print job is received from a sponsor computing device. The account data is adjusted to add credits in an adjustment amount that is a function of marking agent consumption to print the job. The job is sent to the printer for printing.

10 Claims, 4 Drawing Sheets

(56) References Cited

U.S. PATENT DOCUMENTS

| | | | |
|---|---|---|---|
| 6,112,039 A * | 8/2000 | Salgado | G03G 21/02 399/43 |
| 6,173,274 B1 * | 1/2001 | Ryan, Jr. | G06Q 30/0269 235/375 |
| 6,603,975 B1 | 8/2003 | Inouchi et al. | |
| 6,650,433 B1 | 11/2003 | Keane et al. | |
| 6,712,266 B2 | 3/2004 | Bartley et al. | |
| 6,795,205 B1 * | 9/2004 | Gacek | G06Q 20/027 358/1.15 |
| 6,801,333 B1 | 10/2004 | Weiss | |
| 6,854,839 B2 | 2/2005 | Collier et al. | |
| 7,043,523 B2 | 5/2006 | Haines et al. | |
| 7,065,497 B1 | 6/2006 | Brewster et al. | |
| 7,113,299 B2 | 9/2006 | Suzuki | |
| 7,127,433 B2 * | 10/2006 | Baker | G06Q 30/0283 358/1.8 |
| 7,136,177 B1 | 11/2006 | Bryan et al. | |
| 7,319,535 B2 | 1/2008 | Cherry et al. | |
| 7,526,555 B2 | 4/2009 | Shahindoust | |
| 7,545,528 B2 | 6/2009 | Takabayashi et al. | |
| 7,660,539 B2 | 2/2010 | Tye et al. | |
| 7,765,580 B2 | 7/2010 | Vandergeest et al. | |
| 8,051,012 B2 | 11/2011 | Ramanathan et al. | |
| 8,296,202 B2 | 10/2012 | Matsuda et al. | |
| 2002/0131079 A1 | 9/2002 | Forbes et al. | |
| 2002/0152183 A1 | 10/2002 | Soares et al. | |
| 2003/0011809 A1 | 1/2003 | Suzuki et al. | |
| 2003/0071726 A1 * | 4/2003 | Hopper | G06K 15/00 340/540 |
| 2003/0074312 A1 | 4/2003 | White | |
| 2003/0078863 A1 | 4/2003 | Pilu | |
| 2003/0187808 A1 | 10/2003 | Alfred et al. | |
| 2004/0056889 A1 | 3/2004 | Katano | |
| 2004/0138945 A1 | 7/2004 | Adkins et al. | |
| 2004/0196491 A1 | 10/2004 | Uchino | |
| 2004/0201613 A1 | 10/2004 | Simpson et al. | |
| 2004/0201709 A1 * | 10/2004 | McIntyre | H04N 1/00307 348/211.2 |
| 2004/0215580 A1 | 10/2004 | Pilu et al. | |
| 2005/0289054 A1 | 12/2005 | Silverbrook et al. | |
| 2006/0069615 A1 * | 3/2006 | Gupta | G06Q 30/0236 705/14.36 |
| 2006/0074816 A1 | 4/2006 | Hibara et al. | |
| 2006/0077431 A1 * | 4/2006 | Zhang | H04N 1/00204 358/1.15 |
| 2006/0114494 A1 * | 6/2006 | Crosby | G06F 3/1207 358/1.15 |
| 2006/0271424 A1 | 11/2006 | Gava et al. | |
| 2007/0035762 A1 | 2/2007 | Wilsher et al. | |
| 2007/0136283 A1 * | 6/2007 | Silverbrook | G06F 17/30637 707/6 |
| 2007/0188530 A1 | 8/2007 | Garrana et al. | |
| 2007/0283447 A1 | 12/2007 | Hong et al. | |
| 2008/0310875 A1 | 12/2008 | Rahman et al. | |
| 2008/0319845 A1 * | 12/2008 | Adkins | G06Q 30/02 705/14.27 |
| 2009/0016743 A1 | 1/2009 | Tye et al. | |
| 2009/0016748 A1 | 1/2009 | Ferlitsch | |
| 2009/0030837 A1 | 1/2009 | Knodt | |
| 2009/0070243 A1 | 3/2009 | Buck et al. | |
| 2009/0089192 A1 | 4/2009 | Ferlitsch | |
| 2009/0265286 A1 | 10/2009 | Nagarajan | |
| 2009/0307029 A1 * | 12/2009 | Ramanathan | G06Q 10/00 705/67 |
| 2010/0036720 A1 * | 2/2010 | Jain | G06Q 30/02 705/14.13 |
| 2010/0053673 A1 | 3/2010 | Oba | |
| 2010/0312626 A1 * | 12/2010 | Cervenka | G06Q 20/12 705/14.17 |
| 2011/0191148 A1 | 8/2011 | Carlson et al. | |
| 2011/0191183 A1 * | 8/2011 | Jones | G06Q 30/0257 705/14.55 |
| 2011/0220711 A1 * | 9/2011 | Hendley | G06Q 30/06 235/375 |
| 2011/0235113 A1 | 9/2011 | Ohara | |
| 2012/0203618 A1 | 8/2012 | Roever | |
| 2012/0212768 A1 * | 8/2012 | Evanitsky | G06F 3/1204 358/1.15 |
| 2012/0307263 A1 | 12/2012 | Ichikawa et al. | |
| 2012/0307298 A1 * | 12/2012 | Ishige | H04N 1/00222 358/1.15 |
| 2012/0327449 A1 | 12/2012 | Lee | |
| 2013/0006871 A1 | 1/2013 | Stefik et al. | |
| 2013/0010333 A1 | 1/2013 | Anand et al. | |
| 2013/0073391 A1 | 3/2013 | Young | |
| 2013/0110744 A1 | 5/2013 | Hendley et al. | |
| 2013/0141761 A1 * | 6/2013 | Yoshida | G06F 3/1237 358/1.15 |
| 2014/0215584 A1 | 7/2014 | Webb et al. | |
| 2014/0355029 A1 | 12/2014 | Mccoog | |

FOREIGN PATENT DOCUMENTS

| | | |
|---|---|---|
| CN | 101996059 | 3/2011 |
| KR | 1020020079446 A | 10/2002 |
| KR | 100812694 B1 | 3/2008 |
| WO | WO-0076204 A1 | 12/2000 |
| WO | WO-0102946 A1 | 1/2001 |
| WO | WO-0102948 A1 | 1/2001 |
| WO | WO-0184429 A1 | 11/2001 |
| WO | WO-2010056739 A2 | 5/2010 |
| WO | WO-2011115987 A2 | 9/2011 |

OTHER PUBLICATIONS

Kalochristianakis, M. et al., The Concept and Design of an Open, Integrated Print Charging System, (Research Paper), Panhallenic Conference on Informatics, Sep. 30-Oct. 2, 2011, pp. 292-296.

Staples, "Price List," Copy and Print, Jan. 17, 2009, <http://web.archive.org/web/20090117091458/http://www.staplescopyandprint.ca/Downloads/BrochureENG_pricelist.pdf.

Wikipedia, "Digital wallet," Jul. 21, 2009, <http://web.archive.org/web/20090721024634/http://en.wikipedia.org/wiki/Digital_wallet>.

Wikipedia, "Electronic bill payment," Aug. 5, 2009, <http://web.archive.org/web/20090805062547/http://en.wikipedia.org/wiki/Electronic_bill_payment>.

Wikipedia, "Electronic money," May 3, 2009, <http://web.archive.org/web/20090503070004/http://en.wikipedia.org/wiki/Electronic_money>.

Wikipedia, "PayPal," Oct. 16, 2009, <http://web.archive.org/web/20091016145237/http://en.wikipedia.org/wiki/PayPal>.

Wikipedia, "Prepaid mobile phone," Nov. 12, 2009, <http://web.archive.org/web/20091112171924/http://en.wikipedia.org/wiki/Prepaid_mobile_phone>.

Xerox, "Xerox eConcierge Supplies Assistant Technical Information," 2012, 4 pages, available at https://www.xeroxdirect.ca/include/XDEFS-01C.PDF.

* cited by examiner

MARKING AGENT CREDIT ADJUSTMENTS

BACKGROUND

Certain printers are capable of receiving communications and printable content via the internet without being connected to a desktop computer, notebook computer, or other host computing device. An advantage of such a printer is that print jobs can be received for printing from other computing devices located anywhere around the globe.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

DETAILED DESCRIPTION OF EXAMPLES

Figure 1:
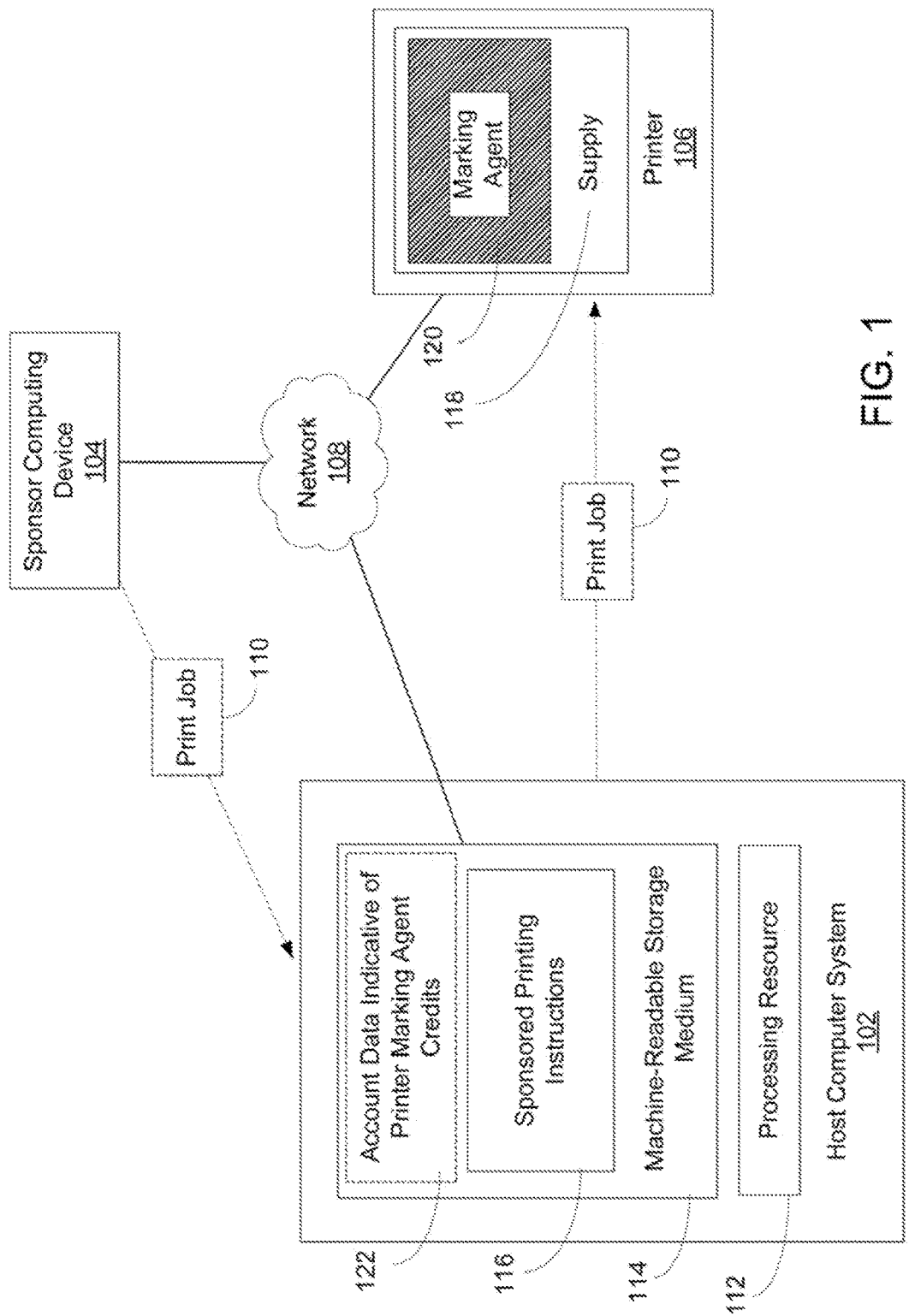
FIG. 1 is a block diagram depicting an example of a system for marking agent credit adjustment.

The ability of an internet-connected printer to receive print jobs from other computing devices located around the globe is significant in that it makes it possible for a user at a printer to print jobs provided by other users. This functionality can provide a significant opportunity for a provider of a print job, e.g., a family member, a retailer, or any other content provider, to make available to a printer user print jobs that will be appreciated, but that might not have otherwise been sought out by the user. In an example, a user of an internet-connected printer will be pleased to receive from a family member via the printer a print job that is a photograph of, or artwork made by, a grandchild. In another example, a user of an internet-connected printer may appreciate receiving coupons, recipes, health information, news, or other print jobs from a trusted retail provider. However, users of internet printers may sometimes be inclined to delay or forego printing print job sent to the printer by others, e.g., due to concerns about the cost of printing such print job.

To address these issues, examples described herein provide for sponsored printing of print jobs via the making of marking agent credit adjustments. Examples described herein may operate by storing account data indicative of marking agent credits attributed to a printer. The printer is a printer connected to a supply of marking agent. The marking agent credits are to authorize consumption of a credit amount of marking agent from the supply according to a subscription. Examples described herein may receive a print job from a sponsor computing device, and adjust the account data to add marking agent credits in an adjustment amount that is a function of marking agent consumption to print the job. Examples described herein may determine the marking agent consumption. Other examples described herein may receive from the printer data indicative of the marking agent consumption. Examples described herein may further operate by sending the print job to the printer for printing.

In this manner, consumer and business-based scenarios can exist in which a provider provides to printer users print jobs that will interest the users, and in which the providers are willing to pay for marking agent credits to be added to the users' accounts to partially or completely cover the cost of printing. Providers of content and users of printers will appreciate that the users are enabled to receive and print jobs sent by the providers in situations where such jobs might not have been printed otherwise. Advantages of the disclosure will cause customer satisfaction with sponsored printing, with subscription ink services, and with internet printing generally, to increase.

As used herein, a "printer" or "printing device" refers to any liquid inkjet printer, solid toner-based printer, liquid toner-based printer, or any other electronic device that prints (e.g., any multifunctional electronic device that performs a function such as scanning and/or copying in addition to printing). "Marking agent" refers to any substance that can be consumed by a printer during a printing operation, including but not limited to aqueous inks, solvent inks, UV-curable inks, dye sublimation inks, latex inks, toners, and powders. "Consuming" or "consumption" of marking agent refers to expending by use.

An "email" refers to a message sent electronically from one email address to another email address. In some examples of email systems, the sending and receiving users' computers are not required to be online simultaneously. An "email address" refers to a character string, text, image, graphic, or other element that identifies an address from which electronic messages may be sent, or to which electronic messages may be delivered. A "message" refers to any communication, and is not meant to be limited to text or a character string. A "network" refers to a collection of computing devices interconnected by communications channels that facilitates communications and allows sharing of resources and information among the interconnected devices.

As used herein, a "processing resource" and a "processor" are used synonymously and refer generally to any instruction execution system, such as a computer/processor based system or an ASIC (Application Specific Integrated Circuit), a computer, or other system that can fetch or obtain instructions or logic stored in a memory and execute the instructions or logic contained therein. In examples, a processing resource or processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. In examples described herein, a processor may include, for example, one processor or multiple processors included in a single computing device or distributed across multiple computing devices.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

Referring now to the drawings, FIG. 1 is a block diagram depicting an example of a system for facilitating sponsored printing of print jobs utilizing marking agent credit adjustments. Ha 1 shows a host computer system 102 operatively connected to a sponsor computing device 104 and a printer 106 via a network 108. Host computer system 102 represents generally any computing device or group of computing devices configured to send and receive network requests, send and receive data, including receiving a print job 110 from the sponsor computing device 104, sending a print job 110 to the printer 106, and/or otherwise communicate with sponsor computing device 104, printer 106, and other computing devices via the network 108. Sponsor computing device 104 represents generally any computing device or group of computing devices configured to send and receive network requests, send and receive data, including sending a print job 110, and/or otherwise communicate with host computer system 102 and other computing devices via the network 108.

Printer 106 represents generally any computing device or group of computing devices operable to consume a marking agent to produce a printed print job or printed content. In an example, consumption of marking agent may refer to a using up of marking agent. In another example, consumption of marking agent may refers to a dispensing or ejection of marking agent, e.g., a dispensing or ejection of marking agent upon a media. Printer 106 is operable to send and receive network requests and data via the network 108, including receiving print jobs from host computer system 102. Printer 106 may be additionally operable to otherwise communicate with host computer system 102 and sponsor computing device 104 via the network.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may also include intermediate proxies, routers, switches, load balancers, and the like. The paths followed by network 108 between host computer system 102, sponsor computing device 104, and printer 106 as depicted in FIG. 1 represent the logical communication paths between these devices, not necessarily the physical paths between the devices.

In an example, host computer system 102 includes a processing resource 112 and a machine-readable storage medium 114 encoded with sponsored printing instructions 116. In an example, the instructions 116 cause the host computer system 102 to implement a service to enable sponsorship of print jobs via marking agent credit adjustments. Processing resource 112 may fetch, decode, and execute instructions 116 stored on storage medium 114 to implement the functionalities disclosed herein. In examples, storage medium 114 may include additional instructions. In examples, instructions 116 and any other instructions described herein in relation to storage medium 114 may be stored on a machine-readable storage medium remote from, but accessible to, host computer system 102 and processing resource 112. In examples, decoding may include decrypting. In examples, the functionalities of any of the instructions of storage medium 114 may be implemented in the form of electronic circuitry, in the form of executable instructions encoded on a machine readable storage medium, or a combination thereof.

In examples, host computer system 102 may be any sort of a computing device. In some examples, host computer system 102 may implement at least a portion of a service to enable provider-sponsorship of print jobs via the making of marking agent credit adjustments. In some examples, instructions 116 may be part of a larger set of instructions implementing such a marking agent credit adjustment service. In some examples, portions of a marking agent credit adjustment service may be implemented on different computing devices.

In the example of FIG. 1, a printer 106 is a printer connected to a supply 118 of marking agent 120. The sponsored printing instructions 116 stored at machine readable storage medium 114 may cause the host computer system 102 to store account data 122 that is data indicative of marking agent credits 122 attributed to the printer 106. In an example, a marking agent credit refers to data that, when received by a printer, authorizes the printer to dispense or consume a credit amount of a marking agent that is available at the printer pursuant to a marking agent subscription. In an example, a marking agent subscription refers to a right, contract, pledge, or other arrangement to authorize a printer to dispense or consume a prescribed amount of a marking agent for a sum paid, or a fee agreed to be paid. In the example of FIG. 1, each marking agent credit indicated by or represented by the account data 122 is a credit to authorize the printer 106 to consume a credit amount of marking agent 120 from the supply 118 according to the subscription. In an, example, the credit amount may be expressed as a number of pages authorized for printing. In another example, the credit amount may be expressed as a quantity of marking agent to be dispensed or consumed by the printer (e.g. picoliters of ink, cubic millimeters of toner, etc.).

Continuing with the example of FIG. 1, the instructions 116 cause the host computing system 102 to receive a print job 110 from the sponsor computing device 104. As used herein, a "print job" or "job" refers to content and/or instructions as to formatting and presentation of the content sent to a computer system for printing. In examples, a print job may be stored in a programming language and/or a numerical form so that the job can stored and used in computing devices, servers, printers and other machines capable of performing calculations and manipulating data.

Responsive to receipt of the print job 110 at host computer system 102, the instructions 116 cause the host computing system 102 to adjust the account data 122 that is indicative of printer marking agent credits to add credits in an adjustment amount. In examples, the adding of credits in the adjustment amount is to provide compensation, or partially provide compensation for the portion of marking agent 120 that the printer 106 will consume in printing the print job 110. The size of the adjustment amount is a function of the amount of marking agent to be consumed during printing of the job 110. In an example, the instructions 116 may cause the host computer system 102 to determine the adjustment amount utilizing a formula that is stored at, or accessible to, host computer system 102. In a particular example in which the amount of marking agent to be consumed is measured or stated in "pages" to be printed, a formula for determining an adjustment amount may be $$\text{Adjustment Amount} = \text{Number of Pages in Print Job to be Printed}.$$

In an example, the marking agent to be consumed may be measured in "pages", wherein a "page" is an average marking agent distribution for a sheet or length of media, and the average is utilized in calculating marking agent consumption for each media sheet or length printed utilized to print a job.

In another example wherein the marking agent to be consumed is measured in "pages", a "page" may be a measurement classification that is equivalent to a volume measurement, e.g., 1 Page=$X$ picoliters of marking agent.

In another example in which the amount of marking agent to be consumed is measured or stated in "pages" to be printed during printing of a job, and in which the sponsorship arrangement is such that the print job is 50% sponsored by a provider entity, a formula for determining an adjustment amount may be:

Adjustment Amount=(50%)×(Number of Pages to be Printed During Printing of Job).

In another example, the adding of credits in the adjustment amount is to provide compensation that is above and beyond the portion of marking agent 120 that the printer 106 will consume in printing the print job 110. In an example in which the amount of marking agent to be consumed is measured or stated in "pages" to be printed during printing of a job, and in which the sponsorship arrangement is such that the print job is 150% sponsored by a provider entity, a formula for determining an adjustment amount may be:

Adjustment Amount=(150%)×(Number of Pages to be Printed During Printing of Job).

Continuing with the example of FIG. 1, following the adjustment of the account data 122 to add credits in the adjustment amount, the instructions cause the host computer system 102 to send the print job 110 to the printer 106 for printing. In other embodiments, the instructions 116 may cause the host computer system 102 to send the print job 110 to the printer 106 for printing, and after the sending of the job 110 make the adjustment to the account data 122 to add marking agent credits in the adjustment amount. In other embodiments, the instructions 116 may cause the host computer system 102 to make the adjustment to the account data 122 to add marking agent credits in the adjustment amount before sending the print job 110 to the printer 106 for printing.

In this manner, a content provider can send to printers jobs that will be of interest to printer users, and encourage printing of the jobs at the printers by having marking agent credits added to the marking agent subscription account to partially or completely cover the cost of printing. In examples, the receiving of print jobs, e.g., print job 110, from the sponsor computing device 104, and the sending of print jobs, e.g., print job 110, to the printer 106 over the network 108 may be via a networking protocol. The networking protocols utilized may include, but are not limited to, Transmission Control Protocol/Internet Protocol ("TCP/IP"), HyperText Transfer Protocol ("HTTP"), and/or Session Initiation Protocol ("SIP").

In some examples, the sponsored printing service instructions 116 may be part of an installation package that, when installed, may be executed by processing resource 112 to implement the functionalities described herein in relation to the instructions 116. In such examples, storage medium 114 may be a portable medium, such as a CD, DVD, or flash drive, or a memory maintained by a server from which the installation package can be downloaded and installed. In other examples, the instructions 116 may be part of an application or applications already installed on authorization host computer system 102 including processing resource 112. In such examples, the storage medium 114 may include memory such as a hard drive, solid state drive, or the like. In some examples, functionalities described herein in relation to FIG. 1 may be provided in combination with functionalities described herein in relation to any of FIGS. 2-4.

Figure 2:
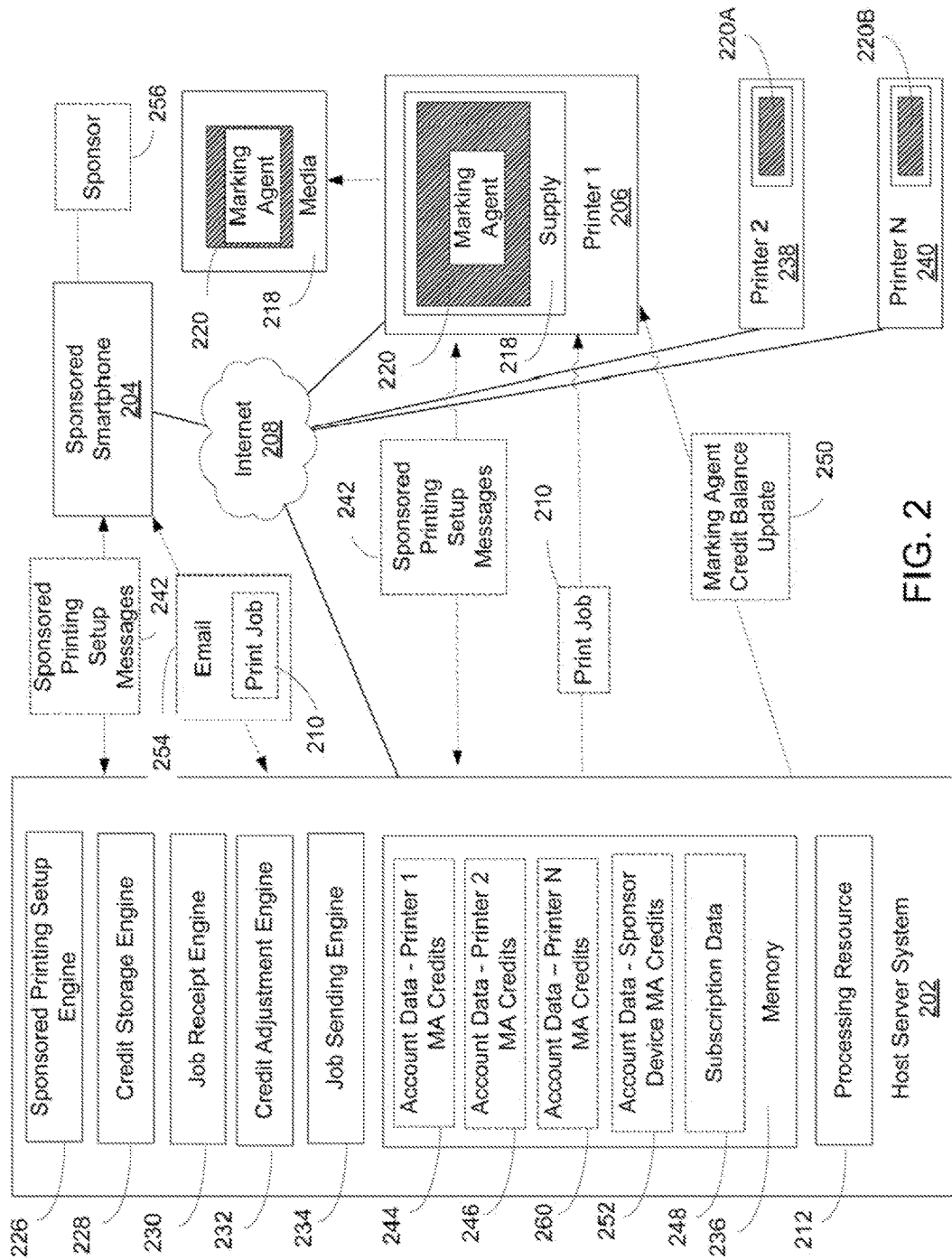
FIG. 2 is a block diagram depicting an example of a system for marking agent credit adjustment.

FIG. 2 is a block diagram depicting an example of a system for facilitating sponsored printing of print jobs utilizing marking agent credit adjustments. FIG. 2 depicts examples of physical and logical components for implementing various embodiments, including components are identified as engines 226 228 230 232 234. In describing engines 226 228 230 232 234, focus is on each engine's designated function. The term engine, as used herein, refers to a combination of hardware and programming configured to perform a designated function. However, in different examples, more, fewer, and/or other components, arrangements of components, etc. may be used according to the teachings described herein. In addition, various engines and other components described herein may be implemented as one or more software components, hardware components, special purpose hardware (e.g., application specific hardware, application specific integrated circuits (ASICs), embedded controllers, hardwired circuitry, etc.), or some combination of these.

Referring now to the drawings, FIG. 2 is a block diagram depicting an example of a system for enabling sponsored printing of print jobs utilizing marking agent credit adjustments. FIG. 2 shows a host server system 202 operatively connected to a sponsored smartphone 204, a printer one 206, a printer two 238, and a printer "N" 240 via an internet 208. Host server system 202 represents generally any computing device or group of computing devices configured to send and receive network requests, send and receive data (including sponsored printing setup messages, emails that include print jobs, and marking agent credit balance updates), and/or otherwise communicate with sponsored smartphone 204, printers one, two and N 206 238 240, and other computing devices via the internet 208. Sponsored smartphone 204 represents generally any computing device or group of computing devices configured to send and receive network requests, send and receive data, including sending emails with print jobs, and/or otherwise communicate with host server system 202 and other computing devices via the internet 208.

Printer one 206, printer two 238, and printer N 240 each represents generally any computing device or group of computing devices operable to dispense or otherwise consume a marking agent marking agent to produce a printed print job or printed content. In this example, each of printers one, two and N 206 238 240 is operable to send and receive network requests and data via the internet 208, including receiving print jobs from host server system 202. Printers one, two, and N 206 238 340 may be additionally operable to otherwise communicate with host server system 202 and sponsored smartphone 204 via the internet 208.

Internet 208 may include, at least in part, an intranet the internet, or a combination of both. The paths followed by internet 208 between the host server system 202, the sponsored smartphone 204, and printers one, two and N 206 238 240 as depicted in FIG. 2 represent the logical communication paths between these devices, not necessarily the physical paths between the devices.

Host server system 202 is shown to include a sponsored printing setup engine 226, a credit storage engine 228, a job receipt engine 230, a credit adjustment engine 232, a job sending engine 234, and a memory 236. In performing their respective functions, the engines 226 228 230 232 234 may access memory 236. Memory 236 represents generally any memory accessible to the engines 226 228 230 232 234 that can be used to configured to store and retrieve data.

In the example of FIG. 2, sponsored printing setup engine 226 causes the host server system 202 to receive a setup message 242 from printer one 206 or exchange a set of setup messages 242 with printer one 206. In this example, the setup message 242 is a message to authorize host server system 202 to forward print jobs received at server system 202 from the sponsored smartphone to printer one 206. In an example, the setup messages 242 may be sent by the printer one 206 as the result of user interaction with a touchpad or other interface at the printer one 206. In another example, a setup message to authorize host server system 202 to forward print jobs received at server system 202 from the sponsored smartphone to printer one 206 may be received from another computing device, e.g. a notebook computer or tablet computer via the another computing device accessing a web page that allows a user to set sponsored printing preferences for printer one 206. In an example, the host server system 202 may additionally receive sponsored printing setup messages 242 from sponsored smartphone 204 to authorize the forwarding to printer one 206 of print jobs received at server system 202 from the sponsored smartphone 204.

In an example, a setup messages 242 setup message received at host server system 202 (e.g., from sponsored smartphone 204) may establish a formula for determining a marking agent credit adjustment amount that considers marking agent consumption to print the job. In an example which the amount of marking agent to be consumed is measured or stated in volume of ink to be consumed, during printing of a job, a formula for determining an adjustment amount may be Adjustment Amount=Picoliters of Ink to be Consumed During Printing of Job.

In other examples, the marking agent to be consumed may be a marking agent other than ink, e.g., a toner or a powder, and the quantity to be consumed may be determined utilizing a measurement other than a volume measurement, e.g., a measurement of mass or weight.

Continuing with the example of FIG. 2, the credit storage engine 226 causes the host server system 202 to store printer one account data 244 indicative of marking agent credits attributed to printer one 206, printer two account data 246 indicative of marking agent credits attributed to printer two 238, and printer N account data 260 indicative of marking agent credits attributed to printer N 240. In the example of FIG. 2, each of printer one 206, printer two 238, and printer N 240 is connected to separate supplies of marking agent 220 220A 220B. In an example, the printer one account data 244 may be indicative of marking agent credits for printer one 206 purchased by a user of printer one 206, wherein each credit is to authorize consumption of a "credit amount" of marking agent from a marking agent supply at the printer according to a subscription. In an example, the printer one account data 244 indicative of marking agent credits attributed to printer one 206 is adjusted to add credits responsive to receipt at host server system 202 of data indicating that payment has been made or received for such credits. Similarly, the printer two account data 246 indicative of marking agent credits attributed to printer two 238, and the printer N account data 260 indicative of marking agent credits attributed to printer N 240 may be adjusted to add credits responsive to receipt at host server system 202 of data indicating that payment has been made or received for such credits (e.g. by users of printers two and N) to provide for the consumption of ink at printers two and N according to subscriptions applicable to printers 2 and N. In an example, the credit amount of marking agent purchased for a printer, e.g., printer one 206, pursuant to a subscription may be less than the marking agent supply 220 that is available at the printer.

In the example of FIG. 2, memory 236 at host server system 202 holds subscription data 248 that is indicative of the subscription that authorizes consumption of marking agent at printer one 206. The subscription may be, or may include, a right, contract, pledge, or other arrangement that authorizes the printer one 206 to consume marking agent 220 held at a marking agent supply 218 that is onboard printer one 206. In an example, the subscription may be a subscription received and stored at host server system 202 as subscription data 248, or made accessible to the host server system 202, responsive to a sum being paid, or an agreement that a sum will be paid, to a marking agent provider entity or marking agent provider user associated with the host server system 202. In a particular example, the subscription data 248 may be received at the host server system 202 from printer one 206 or from sponsored smartphone 204 as a result of a user at printer one 206 or at sponsored smartphone 204 having interacted with a marking agent provision service web page hosted by host server system 202. In another example, the subscription data 248 may be received at the host server system 202 via the Internet 208 as part of, or in conjunction with, a sponsored printing setup message 242 sent by printer one 206 or sponsored smartphone 204.

As used in this disclosure, a "subscription" is not limited to an arrangement where the fee is prepaid. In an example, the subscription data 248 may be representative of a subscription arrangement where the fee is to be paid after the consumption of the marking agent. In a particular example, the fee to be paid to a provider pursuant to a subscription may be a fee to be paid at the end of a measuring period (e.g., end of month), e.g., $X at the end of each month to authorize a predetermined consumption of marking agent 110, e.g., ink to print 500 document pages at printer one 206. A particular example of a subscription for utilization of marking agent 220 at printer one 206 follows:

Subscription=$X/month, 100 marking agent pages included per month, $1 per 20 pages for additional pages per month, with payment due: 30 days after an end of month usage report.

Continuing with the example of FIG. 2, the host server system 202 additionally stores sponsor device account data 252 indicative of sponsor device marking agent credits attributed to the sponsored smartphone 204, or to a sponsor entity 256 that is associated with the sponsored smartphone 204. In an example, the sponsor device account data 252 indicative of sponsor device marking agent credits attributed to sponsored smartphone 204 or its sponsoring entity 256 is adjusted to add credits responsive to receipt at host server system 202 of data indicating that payment for such credits has been made or received.

In an example, the sponsor device account data 252 is indicative of a pool of marking agent credits that can be debited or drawn against, as the host server system adds to or supplements the printer one account data 244, the printer two account data 246, or the printer N account data 260 indicative of marking agent credits as a result of printing of sponsored print jobs at printer one 206, printer two 238, or printer N 240, as applicable.

Continuing with the example of FIG. 2, the job receipt engine 230 causes the host server system 202 to receive from the sponsored smartphone 204 an email 254 that includes a print job 210. In an example, the print job may be included in the email as an attachment, e.g., an attached document or image file. In another example, the print job may be included as text within a body of the email. In other examples, the host server system 202 may receive the print job 210 from the sponsored smartphone 204 by means other than email delivery.

Continuing with the example of FIG. 2, the credit adjustment engine 232 causes the host server system 202 to make an adjustment to the sponsor device account data 252 to decrease, reduce, subtract or deduct credits in the adjustment amount, and to make an adjustment to the printer one account data 244 to increase or add marking agent credits in the adjustment amount. The adjustment amount is at least a portion of a consumption amount of marking agent consumed, or to be consumed, to print the print job 210.

As discussed previously, the size or quantity of the adjustment amount may be a function of the formula that is established via the sponsored printing setup messages 242. In a particular example, the formula may be stored in memory 236 at host server system 202 and state: Adjustment Amount=Number of Pages in Print Job. In an example, the credit adjustment engine 232 may cause the host server system 202 to analyze the received print job 210 to determine the marking agent consumption to take place during printing of the job at printer one 206. In an example, the credit adjustment engine 232 may cause the host server system 202 to determine the marking agent consumption to take place during printing of the job at printer one 206 by identifying metadata or other job-size information within the print job 210. In another example, the credit adjustment engine 232 may cause the host server system 202 to receive from printer one 206 data indicative of the marking agent consumption that will occur during printing of the print 210 at printer one 206. In yet another example, the credit adjustment engine 232 may cause the host server system 202 to receive from printer one 206 data indicative of the marking agent consumption that actually occurred during printing of the print 210 at printer one 206.

In a particular example, the credit adjustment engine 232 may make the marking agent credit adjustments to the sponsor device account data 252 and to the printer one account data 244 responsive to detecting a sponsored print job flag included within the print job 210, or within a message that accompanies the print job 210. In a particular example, sponsored print job flag may be included with an email 254 that includes the print job 210. As used herein, "flag" refers to any indicia or marking of email or message that the print job 210 received at host server system 202 is to be treated as a sponsored print job causing adjustments to be made to the sponsor device account data 252 and to the printer one account data 244 that are indicative of marking agent credits.

In an example, the credit adjustment engine 232 may send to printer one 206 a marking agent credits balance update 250. In an example, the credits balance update 250 may be data, e.g., a message, indicative of the adjusted printer one account data 244. The adjusted printer one account data 244 is data indicative of the number of printer one marking agent credits available to authorize printing at printer one 206. In an embodiment, receipt of the balance update 250 at printer one 206 informs printer one 206 that sufficient marking agent credits are in place, as evidenced by printer one account data 244, to authorize printing of the job 210. In another example, the credits balance update 250 may include at least a portion of the printer one account data 244, the portion indicative of an amount of marking agent 220 authorized for immediate consumption at printer one 206.

It should be noted that while the foregoing discussion has been with respect to adjustment of account data indicative of marking agent credits to compensate for projected marking agent consumption, it is also contemplated that the printer one account data 244 indicative of marking agent credits could be adjusted to offset other printing expenses. For example, e.g., the printer one account data 244 could be adjusted to add marking agent credits in a supplemental adjustment amount that is a function of a printing cost other than marking agent consumption. In a particular example, the printer one account data 244 may be adjusted to add marking agent credits in a supplemental adjustment amount that is a function of projected or media consumption to occur, or of actual media consumption that occurred, during printing of the job 210. In another example, the printer one account data 244 may be adjusted to add marking agent credits in a supplemental adjustment amount that is a function of projected electricity or power consumption, or of actual electricity or power consumption that occurred, during printing of the job 210. In another example, the printer one account data 244 may be adjusted to add marking agent credits in a supplemental adjustment amount that is a function of an estimated depreciation in value of a printer that may occur during printing of a print job.

Continuing with the example of FIG. 2, the job sending engine 234 causes the host server system 202 to send the print job 210 to printer one 206 for printing. In examples, the job sending engine may send the print job 210 to printer one 206, over the network 208 via a networking protocol, including but not limited to Transmission Control Protocol/Internet Protocol ("TCP/IP"), HyperText Transfer Protocol ("HTTP"), and/or Session Initiation Protocol ("SIP").

In an example, the functions and operations described with respect to the sponsored printing setup engine 226, the credit storage engine 228, the job receipt engine 230, the credit adjustment engine 232, the job sending engine 234, and the host server system 202 may be implemented as a non-transitory computer-readable storage medium containing instructions executed by a processor (e.g., processing resource 212) and stored in a memory (e.g., memory 236). In a given implementation, processing resource 212 may represent multiple processors, and memory 236 may represent multiple memories.

Figure 3:
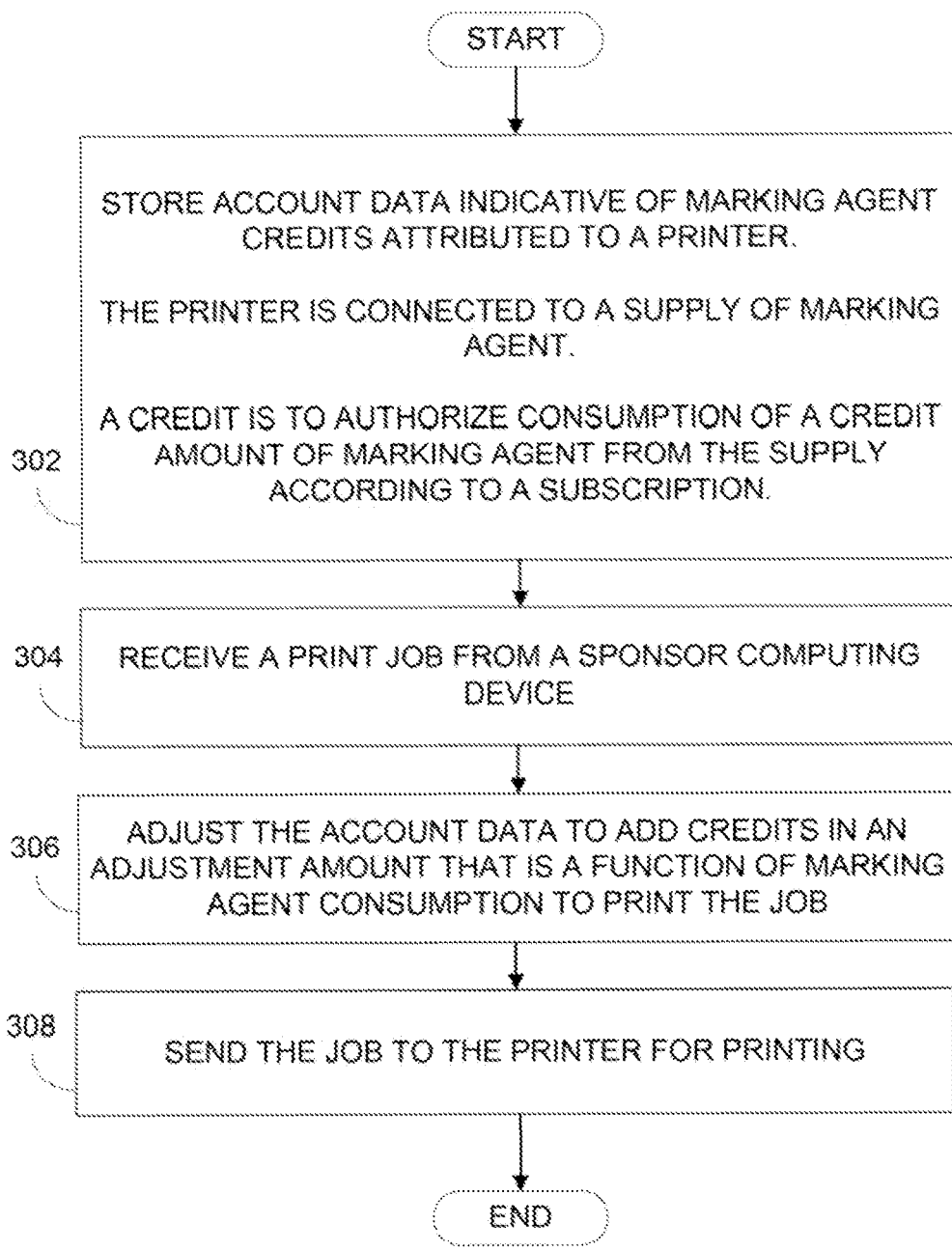
FIG. 3 is a flow diagram depicting steps taken to implement an example.

FIG. 3 is a flow diagram of operation in a system according to various examples. In discussing FIG. 3, reference may be made to the diagrams of FIGS. 1 and 2 to provide contextual examples. Implementation, however, is not limited to those examples. Starting with FIG. 3, account data that is indicative of marking agent credits attributed to a printer is stored. The printer is a printer connected to a supply of marking agent. A marking agent credit is to authorize consumption of a credit amount of marking agent from the supply according to a subscription (block 302). Referring back to FIGS. 1 and 2, the sponsored printing instructions 116 (FIG. 1), when executed by processing resource 112 (FIG. 1), or the credit storage engine 228 (FIG. 2), may be responsible for implementing block 302.

Continuing with FIG. 3, a print job is received from a sponsor computing device (block 304). Referring back to FIGS. 1 and 2, the sponsored printing instructions 116 (FIG. 1), when executed by processing resource 112 (FIG. 1), or the job receipt engine 230 (FIG. 2), may be responsible for implementing block 304.

Continuing with FIG. 3, the account data is adjusted to add credits in an adjustment amount that is a function of marking agent consumption to print the job (block 306). Referring back to FIGS. 1 and 2, the sponsored printing instructions 116 (FIG. 1), when executed by processing resource 112 (FIG. 1), or the credit adjustment engine 232 (FIG. 2), may be responsible for implementing block 306.

Continuing with FIG. 3, the job is sent to the printer for printing (block 308). Referring back to FIGS. 1 and 2, the sponsored printing instructions 116 (FIG. 1), when executed by processing resource 112 (FIG. 1), or the job sending engine 234 (FIG. 2), may be responsible for implementing block 308.

Figure 4:
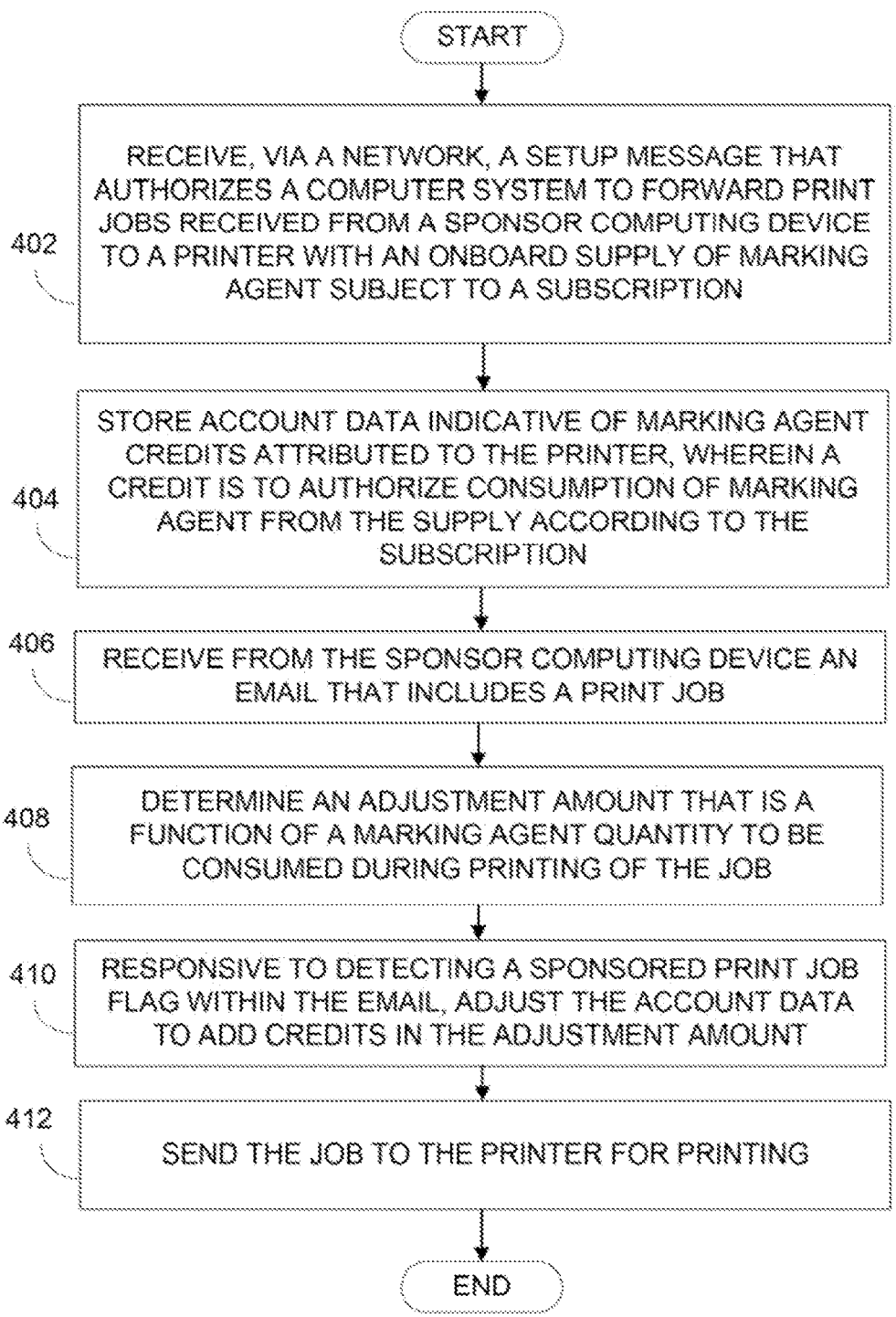
FIG. 4 is a flow diagram depicting steps taken to implement an example.

FIG. 4 is a flow diagram of operation in a system according to various examples. In discussing FIG. 4, reference may be made to the diagrams of FIGS. 1 and 2 to provide contextual examples. Implementation, however, is not limited to those examples. Starting with FIG. 4, a setup message is received via a network. The setup message is a message to authorize a computer system to forward print jobs received from a sponsor computing device to a printer. The printer is a printer with an onboard supply of marking agent subject to a subscription (block 402). Referring back to FIGS. 1 and 2, the sponsored printing instructions 116 (FIG. 1), when executed by processing resource 112 (FIG. 1), or the sponsored printing setup engine 226 (FIG. 2), may be responsible for implementing block 402.

Continuing with FIG. 4, account data is stored. The account data is indicative of marking agent credits attributed to the printer, wherein a credit is to authorize consumption of marking agent from the supply according to the subscription (block 404). Referring back to FIGS. 1 and 2, the sponsored printing instructions 116 (FIG. 1), when executed by processing resource 112 (FIG. 1), or the credit storage engine 228 (FIG. 2), may be responsible for implementing block 404.

Continuing with FIG. 4, an email that includes a print job is received from the sponsor computing device (block 406). Referring back to FIGS. 1 and 2, the sponsored printing instructions 116 (FIG. 1), when executed by processing resource 112 (FIG. 1), or the job receipt engine 230 (FIG. 2), may be responsible for implementing block 406.

Continuing with FIG. 4, an adjustment amount is determined. The adjustment amount is a function of a marking agent quantity to be consumed during printing of the job (block 408). Referring back to FIGS. 1 and 2, the sponsored printing instructions 116 (FIG. 1), when executed by processing resource 112 (FIG. 1), or the credit adjustment engine 232 (FIG. 2), may be responsible for implementing block 408.

Continuing with FIG. 4, responsive to detecting a sponsored print job flag within the email, the account data is adjusted to add credits in the adjustment amount (block 410). Referring back to FIGS. 1 and 2, the sponsored printing instructions 116 (FIG. 1), when executed by processing resource 112 (FIG. 1), or the credit adjustment engine 232 (FIG. 2), may be responsible for implementing block 410.

Continuing with HG. 4, the print job is sent to the printer for printing (block 412). Referring back to FIGS. 1 and 2, the sponsored printing instructions 116 (FIG. 1), when executed by processing resource 112 (FIG. 1), or the job sending engine 234 (FIG. 2), may be responsible for implementing block 412.

Various modifications may be made to the disclosed examples and implementations without departing from their scope. Therefore, the illustrations and examples herein should be construed in an illustrative, and not a restrictive, sense.

What is claimed is:

1. A non-transitory machine-readable storage medium comprising instructions that, when executed by a processor of a system, cause the processor to:
store account data indicative of credits of a printer and account data indicative of credits of a sponsor computing device, wherein a credit is used to authorize the printer to consume a credit amount of marking agent from a marking agent supply;
in response to receipt of a print job from the sponsor computing device, deduct credits from the account data of the sponsor computing device and add credits to the account data of the printer to compensate for an amount of marking agent to be consumed by the printer to print the print job, wherein the print job is received via an email;
responsive to detecting a sponsored print job flag in the email, add credits in an adjustment amount to the account data of the printer; and
send the print job to the printer for printing.

2. The non-transitory machine-readable storage medium of claim 1, wherein the credits are stated in terms of pages of printing.

3. The non-transitory machine-readable storage medium of claim 1, wherein the instructions cause the processor of the system to receive data indicative of the marking agent consumption from the printer.

4. The non-transitory machine-readable storage medium of claim 1, wherein the account data of the sponsor computing device is adjusted to add credits responsive to receipt of data indicative of a payment.

5. The non-transitory machine-readable storage medium of claim 1, wherein the instructions cause the processor of the system to send to the printer a portion of the account data of the printer, the portion indicative of an amount of marking agent authorized for immediate consumption at the printer.

6. A system, comprising:
a processor;
a credit storage engine, executed by the processor, to store account data indicative of credits of a printer and account data indicative of credits of a sponsor computing device, wherein the printer is connected to a supply of marking agent, and a credit is used to authorize the printer to consume a credit amount of marking agent from the supply;
a job receipt engine, executed by the processor, to receive a print job via an email from the sponsor computing device;
a credit adjustment engine, executed by the processor, to
analyze the print job to determine a consumption amount of marking agent consumption to print the print job,
deduct credits from the account data of the sponsor computing device,
responsive to detecting a sponsored print job flag in the email, add credits in an adjustment amount to the account data of the printer, and
increase credits to the account data of the printer to compensate for the consumption amount of marking agent to be consumed by the printer to print the print job; and
a job sending engine, executed by the processor, to send the print job to the printer for printing.

7. The system of claim 6, further comprising a sponsored printing setup engine executed by the processor, to receive at least one message to
authorize forwarding of the print job received from the sponsor computing device to the printer; and establish a formula for determining an amount of marking agent consumption to print the job.

8. A processor-implemented method, comprising:

receiving at least one setup message that authorizes a computer system to forward, via a network, print jobs received from a sponsor computing device to a printer that has an onboard supply of marking agent subject to a subscription;

storing account data indicative of credits of the printer and account data indicative of credits of the sponsor computing device, wherein a credit is used to authorize the printer to consume marking agent from the supply;

receiving from the sponsor computing device an email that includes a print job;

analyzing the print job to determine a marking agent quantity to be consumed by the printer during printing of the print job;

determining an adjustment amount of credits based on the marking agent quantity to be consumed by the printer during printing of the job;

deduct credits in the adjustment amount from the account data of the sponsor computing device and add credits in the adjustment amount to the account data of the printer;

detecting a sponsored print job flag within the email;

adding credits in the adjustment amount to the account data of printer in response to the detection of the sponsored print job flag in the email; and sending the print job to the printer for printing.

9. The method of claim 8, wherein analyzing the print job to determine the marking agent quantity to be consumed by the printer during printing of the print job includes identifying metadata or other job-size information within the print job.

10. The method of claim 8, wherein the marking agent quantity to be consumed by the printer is measured in pages.

* * * * *